United States Patent [19]

Cook et al.

[11] 4,323,263
[45] Apr. 6, 1982

[54] BICYCLE FRONT FORK ASSEMBLY

[76] Inventors: Craig A. Cook, 4810 Park Newport, Newport Beach, Calif. 92627; Gary B. Cook, 26871 Avenido Domingo, Mission Viejo, Calif. 92675

[21] Appl. No.: 121,876
[22] Filed: Feb. 15, 1980
[51] Int. Cl.³ .................................................. B62K 21/14
[52] U.S. Cl. .................................... 280/279; 74/551.1
[58] Field of Search .............. 280/279, 280, 278, 277, 280/274, 270; 74/551.1, 551.3

[56] References Cited

U.S. PATENT DOCUMENTS 412,216 10/1889 Warwick ...................... 74/551.1 X
573,316 12/1896 Willits ............................... 74/551.1

FOREIGN PATENT DOCUMENTS 823262 12/1951 Fed. Rep. of Germany ...... 280/279
1413659 8/1965 France ............................... 280/279
228411 2/1925 United Kingdom ............... 74/551.3

Primary Examiner—John A. Pekar
Attorney, Agent, or Firm—Knobbe, Martens, Olson, Hubbard & Bear

[57] ABSTRACT

A bicycle front fork assembly includes a steer tube which extends through and above the head tube on the bike frame so that a handlebar may be attached to the front fork by means of a bracket-like clamp which directly grips the exterior upper end of the steer tube.

2 Claims, 3 Drawing Figures

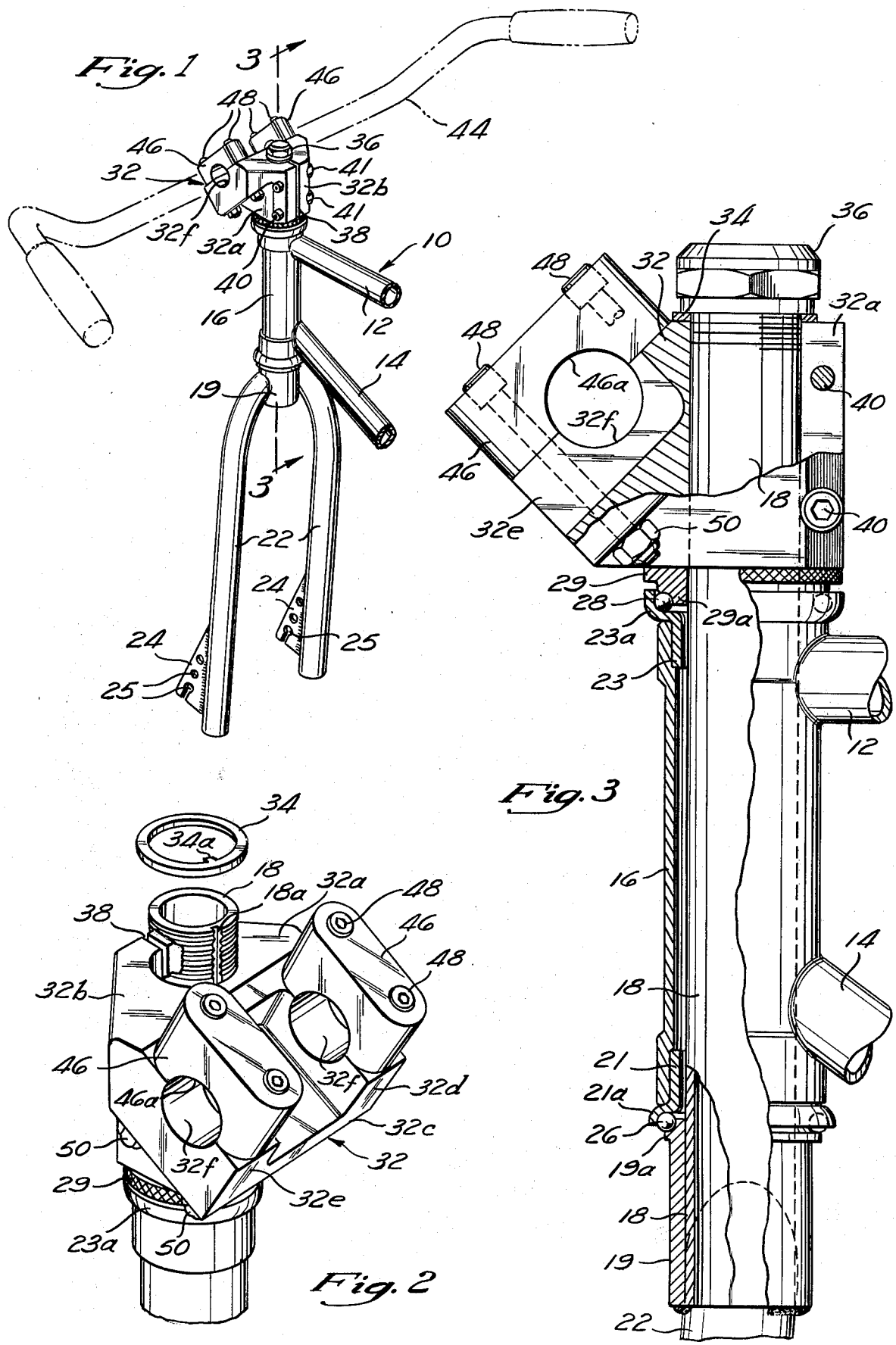

BICYCLE FRONT FORK ASSEMBLY

BACKGROUND OF THE INVENTION

This invention relates to an improved means for mounting handlebars for bicycles and the like.

Typically bicycle handlebars are mounted by means of a handlebar stem assembly including a long bolt and a tubular stem which extend into the upper end of the steer tube on the front fork of the bike. The handlebar stem usually includes a member on the lower end of the bolt and stem which is wedged or cammed eccentrically outwardly against the interior wall of the steer tube to connect the stem to the fork. While there are some advantages of such an approach, one disadvantage is that the handlebar stem has to be a relatively heavy, thick-walled element to provide adequate strength. This is undesirable for racing bicycles in which reduced weight is a significant advantage.

Moreover, it is difficult to maintain sufficient connecting force on a handlebar stem wedge arrangement to prevent handlebars from rotating with bicycles receiving heavy jolts such as are encountered in offtrack racing. In other words, it is important that the means for supporting the handlebar and connecting the handlebar to the bicycle front fork be strong, reliable, and lightweight for high performance bicycles. Thus, a need exists for improvements in those areas.

SUMMARY OF THE INVENTION

In accordance with the present invention, the handlebar stem of the prior art is eliminated, thus eliminating its weight and lack of reliability. Instead, the steer tube on the upper end of the front fork is made longer than normal so that it extends well above the head tube on the front of the bicycle frame, the head tube being rotatably supported on the steer tube by suitable bearings. A clamp-like bracket surrounds the upper end of the steer tube gripping the exterior of the tube in an adjustable and strong and reliable manner, and holding the bearings and the head tube in proper position. The handlebar is mounted on the bracket by suitable clamp lugs connected to the bracket to grip adjustably the central portion of the handlebar. Thus, the handlebar is connected through the front fork assembly in a direct and reliable manner.

BRIEF DESCRIPTION OF THE DRAWINGS

FIG. 1 is a perspective view of the front portion of a bicycle showing the front fork and handlebar support assembly viewed from the back side of the assembly, looking forwardly;

FIG. 2 is an enlarged perspective view, partially exploded and cutaway, of the handlebar support assembly viewed from the front and looking rearwardly; and FIG. 3 is a cross-sectional view taken on the line 3—3 of FIG. 1.

Referring to the drawing, there is shown a bicycle frame 10 having an upper support tube 12 an a lower support tube 14, bolt welded to a generally vertically oriented front or head support member or tube 16. The tube 16 is rotatably supported on the upper portion or steer tube 18 of the front fork 20. The lower end of the steer tube 18 is welded to a pair of downwardly extending, spaced legs 22 for receiving the front wheel (not shown) of a bicycle. A pair of gussets 24 are welded to the front side of the lower ends of the legs 22, and holes 25 are formed in such gussets for receiving the axle of a front wheel.

As best seen from FIG. 3, the head tube 16 of the frame 10 is rotatably supported on the steer tube 18. More specifically, a collar 19 is welded to the exterior of the lower end of the steer tube 18, and the upper end of the collar is formed with an outwardly and upwardly facing bearing race 19a which supports a lower ball bearing assembly 26. Fixed to and positioned within the lower end of the head tube 16 is a short cylindrical ring 21 having its lower end flared outwardly and downwardly to form a bearing race 21a which fits over and receives the bearing assembly 26 so that the lower end of the bike frame head tube 16 is rotatably mounted on the fork.

Similarly, within the upper end of the tube 16 there is positioned a ring 23 having its upper end flared outwardly and upwardly to form a bearing race 23a to receive an upper bearing 28. A washer-like element 29 completes the support structure for the head tube 16, with the lower end of the element 29 having an outwardly facing surface forming an upper race 29a for the bearing assembly 28. Note that the ends of the tube 16 are thicker than the central portion to provide greater strength while the thinner central section minimizes weight.

As may be seen, the elongated steer tube of the front fork extends above the upper end of the head tube 16 a considerable distance. This enables a clamp-like bracket 32 to be positioned on the upper end of the head tube, supported on the flat upper surface of the element 29. The clamp-like bracket 32 includes a tubular portion which fits around the upper end of the steer tube, with the end of the steer tube extending above the upper surface of the bracket 32. A washer 34 surrounds the tube 18 and engages the upper surface of the bracket 32, with an inwardly extending tang 34a sliding with an axially-extending slot 18a in the exterior of the tube 18. A nut 36 is threaded to the threaded exterior of the upper end of the steer tube 18 to axially hold the bracket 32 and the bearing support assemblies in position on the steer tube. The upper end of the tube 18 may be left open or may be closed by a disk (not shown) carried by the nut 36.

As best seen in FIG. 1, the bracket 32 extends almost completely around the tube 18 but has a vertically extending gap 38 separating the rear portion of the bracket 32 into a pair of jaw like portions 32a and 32b. Two threaded fasteners 40 extend transversaly through the jaw portions 32a and 32b to enable them to be drawn towards each other so that the clamp-like bracket grips the upper end of the steer tube. By adequately torquing the nuts 41 on the fasteners 40, the steer tube may be firmly gripped in a manner to prevent slippage, and yet the connection may be readily loosened for disassembly.

The bracket 32 further includes an enlarged portion 32c extending outwardly and downwardly from the tubular portion on the side opposite from the jaws 32a and b. The portion 32c also extends outwardly on each side including a pair of spaced support bosses 32d and 32e which straddle the steer tube 18. Each of the bosses is formed with an upwardly facing semicylindrical recess 32f for receiving the central portion of a handlebar 44. A retaining lug 46 similarly formed with a recess 46a for receiving the central portion of the handlebar 44 mates with each of the bosses 32d and e, and a pair of bolts 48 extend through each of the bracket bosses 32e and 32f and the bracket lugs so that when nuts 50 are tightened on the bolts, the bracket 32 and the lugs 46 grip the handlebar and hold it in a selected orientation. The four bolts 48 and nuts 50 are readily accessible for ease of tightening and easy adjustment or removal of the handlebar. Note that the bracket bosses 32d and 32e are angularly oriented so that their upper surfaces which face the lugs 46 are approximately 45° with respect to the steer tube axis. This arrangement permits the handlebar to be positioned close to the axis of the steer tube and provide space for the lugs 46, while minimizing the size of the bracket and yet obtain adequate strength.

Although the bracket 32 appears relatively massive, note that there is a space between the bosses 32d and 32e, which reduces weight, but yet the structure is substantial and strong. With the bracket gripping the exterior of the steer tube 18 throughout the length of the bracket, the connection is very reliable. Similarly, the spaced attachment bosses 32d and 32e on the bracket provide a solid, reliable support for the handlebar capable of withstanding the jolts and loads occurring in off-track racing bikes.

While the preferred form of the invention is illustrated in the drawing, it should be understood that the bracket for supporting the handlebar could be welded or otherwise secured to the steer tube. Welding the bracket would of course prevent ease of disassembly, with the components axially held in position by means of a nut on the upper end of the steer tube. However, the major advantage of eliminating a conventional handlebar stem can be obtained by holding the components axially by means of a nut mounted on the lower end of the steer tube, and in that instance a welded bracket would be more practical. That is the collar 19 would be connected to the fork legs, and the steer tube would extend through the collar and be provided with threads on its lower end so that a nut on the lower end would axially hold the bearing assemblies and the head tube. Thus, the steer tube 18 would be axially movable with respect to the collar 19. The collar and steer tube could be provided with a straight-sided cross-section to make certain the fork legs rotate with the steer tube.

What is claimed is:

1. A bicycle front fork and handlebar support assembly comprising:
    a bicycle front fork having an elongated cylindrical steer tube joined at its lower end to a pair of spaced downwardly extending legs for receiving the front wheel of a bicycle;
    a bicycle frame head tube rotatably supported on said steer tube with the upper end of said steer tube extending above said head tube;
    clamp means surrounding and connected to the upper end of said steer tube, said clamp means including a clamp-like bracket positioned on the upper end of said steer tube having a cylindrical portion that surrounds most of said steer tube and terminates in a pair of spaced jaw-like portions, and a pair of vertically spaced threaded fasteners for drawing said jaw-like portions towards each other to grip said steer tube and securely hold the bracket on the steer tube; and
    a pair of support bosses formed on said bracket integral with said cylindrical portion having recesses defining a horizontal axis for receiving a horizontal portion of a handlebar, retainer means connected to said bosses for clamping said handlebar to said bracket, said support bosses being located on said bracket spaced from said jaw-like portions so that the handlebar is positioned on the opposite side of the steer tube from said jaw-like portions, said bosses including portions extending laterally from said bracket cylindrical portion on opposite sides of the cylindrical portion to straddle said steer tube such that the horizontal axis defined by said recesses is located close to the vertical axis of said cylindrical portion thus enabling the handlebar to be mounted close to said steer tube.

2. The assembly of claim 1 including a first bearing assembly positioned on the lower end of said steer tube and rotatably supporting the lower end of said head tube, and a second bearing assembly surrounding said steer tube and rotatably engaging the upper end of said steer tube, with said clamp means axially holding said bearings and head tube in proper position on said steer tube.

* * * * *